(12) United States Patent
Hillman

(10) Patent No.: US 11,815,524 B2
(45) Date of Patent: Nov. 14, 2023

(54) VOLUME FRACTION METER FOR MULTIPHASE FLUID FLOW

(71) Applicant: Saudi Arabian Oil Company, Dhahran (SA)

(72) Inventor: Thomas Joseph Theodore Hillman, Missouri City, TX (US)

(73) Assignee: Saudi Arabian Oil Company, Dhahran (SA)

( * ) Notice: Subject to any disclaimer, the term of this patent is extended or adjusted under 35 U.S.C. 154(b) by 216 days.

(21) Appl. No.: 17/553,199

(22) Filed: Dec. 16, 2021

(65) Prior Publication Data

US 2023/0194403 A1    Jun. 22, 2023

(51) Int. Cl.
*G01N 9/32* (2006.01)
*G01F 1/38* (2006.01)

(52) U.S. Cl.
CPC .............. *G01N 9/32* (2013.01); *G01F 1/383* (2013.01)

(58) Field of Classification Search
CPC .................................... G01N 9/32; G01N 9/36
See application file for complete search history.

(56) References Cited

U.S. PATENT DOCUMENTS

| | | | |
|---|---|---|---|
| 3,867,839 A | 2/1975 | Herzl | |
| 7,308,832 B1 | 12/2007 | Ifft | |
| 7,367,240 B2 | 5/2008 | Gysling et al. | |
| 8,448,491 B2 | 5/2013 | Van Cleve et al. | |
| 8,915,145 B1 | 12/2014 | Van Orsdol | |
| 9,188,471 B2 | 11/2015 | Khulief et al. | |
| 9,759,592 B2 | 9/2017 | Wee et al. | |
| 10,634,536 B2 | 4/2020 | Song et al. | |
| 10,837,278 B2 | 11/2020 | Zhu et al. | |
| 2018/0231498 A1 | 8/2018 | Amir et al. | |

FOREIGN PATENT DOCUMENTS

WO    2009149361 A1    12/2019

OTHER PUBLICATIONS

Wu et al. "The Development of a Gas-Liquid Two-Phase Flow Sensor Applicable to CBM Wellbore Annulus" Sensors 2016, 16, 1943, 22 pgs.

*Primary Examiner* — Alexander A Mercado
(74) *Attorney, Agent, or Firm* — DINSMORE & SHOHL LLP

(57) ABSTRACT

A volume fraction meter that includes a flow meter coupled to a flow line. The flow line includes a turned portion and the flow meter is positioned upstream from the turned portion with respect to a flow direction. The flow meter is configured to measure a volumetric flow rate of a multiphase fluid flowing in the flow direction through the flow line. The flow line includes a nozzle opening downstream the turned portion. The volume fraction meter also includes a strain gauge coupled to the flow line between the flow meter and the turned portion of the flow line. The strain gauge is configured to measure a bending strain on the flow line upon discharge of the multiphase fluid through the nozzle opening, such that the bending strain and the volumetric flow-rate provide inputs for determining a mixture density of the multiphase fluid.

20 Claims, 3 Drawing Sheets

VOLUME FRACTION METER FOR MULTIPHASE FLUID FLOW

BACKGROUND

Field

The present disclosure relates to a volume fraction meter for measuring the amounts of liquid and gas in a multiphase fluid flow.

Technical Background

During oil and gas production and downstream processes, measurements of gas and liquid volume percentages of a multiphase fluid flowing in a pipeline are often performed as changes in these volume percentages can indicate the need to change operations. However, it is difficult to measure the relative volume percentages in multiphase fluid flow, due to the inherent differences between liquid and gas. Additional difficulty arises because current measurement techniques are not uniformly sensitive to fluids at all locations in a cross-section of a pipe. Indeed, it can be particularly difficult to measure the amount of liquid in a wet gas flow, i.e., multiphase fluid where 90% or more of the multiphase fluid is in the gas phase. If a measurement technique is calibrated for one flow regime or a pattern in the structure of the flow then it typically becomes inaccurate in a different flow regime. Moreover, many measurement methods assume that the two phases are moving at the same rate, which is not always the case, many methods are limited in the range of fluid volume percentages that can be accommodated, and many methods use radioactive sources, which adds difficultly to shipment, maintenance, calibration, and disposal.

Accordingly, there is a need for a technique which measures the volume fractions of both phases in a two phase flow and works accurately for all flow regimes and all relative flow rates of the phases, and does not require radioactive sources.

SUMMARY

According to an embodiment of the present disclosure, a volume fraction meter includes a flow meter coupled to a flow line. The flow line includes a turned portion and the flow meter is positioned upstream from the turned portion with respect to a flow direction. The flow meter is configured to measure a volumetric flow rate of a multiphase fluid flowing in the flow direction through the flow line, where the multiphase fluid includes a gas portion and a liquid portion. The flow line includes a nozzle opening downstream the turned portion. The volume fraction meter also includes a strain gauge coupled to the flow line between the flow meter and the turned portion of the flow line. The strain gauge is configured to measure a bending strain on the flow line upon discharge of the multiphase fluid through the nozzle opening, such that the bending strain and the volumetric flow rate provide inputs for determining a mixture density of the multiphase fluid.

According to another embodiment of the present disclosure, a flow system includes a flow line having a primary flow line and a secondary flow line. The secondary flow line includes a nozzle opening and a turned portion that is upstream the nozzle opening in a flow direction. The secondary flow line is fluidly coupled to the primary flow line at a fluid inlet. In addition, a volume fraction meter is coupled to the secondary flow line and includes a flow meter coupled to the secondary flow line upstream the turned portion with respect to the flow direction. The flow meter is configured to measure a volumetric flow rate of a multiphase fluid flowing in the flow direction through the flow line, the multiphase fluid having a gas portion and a liquid portion. The volume fraction meter also includes a strain gauge coupled to the secondary flow line between the flow meter and the turned portion of the flow line. The strain gauge is configured to measure a bending strain on the secondary flow line upon discharge of the multiphase fluid through the nozzle opening, such that the bending strain and the volumetric flow rate provide inputs for determining a mixture density of the multiphase fluid.

According to yet another embodiment of the present disclosure, a method of determining a volume fraction of a liquid portion and a gas portion in a multiphase fluid includes measuring a volumetric flow rate of a multiphase fluid flowing through a flow line in a flow direction using a flow meter coupled to the flow line. The flow line includes a turned portion. The flow meter is positioned upstream the turned portion with respect to the flow direction. The flow line includes a nozzle opening downstream the turned portion. The method also includes measuring a bending strain on the flow line upon discharge of the multiphase fluid through the nozzle opening using a strain gauge coupled to the flow line between the flow meter and the turned portion, determining a mixture density of the multiphase fluid based on the volumetric flow rate and the bending strain, and determining a volume fraction of a liquid portion and a gas portion of the multiphase fluid based on the mixture density of the multiphase fluid.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
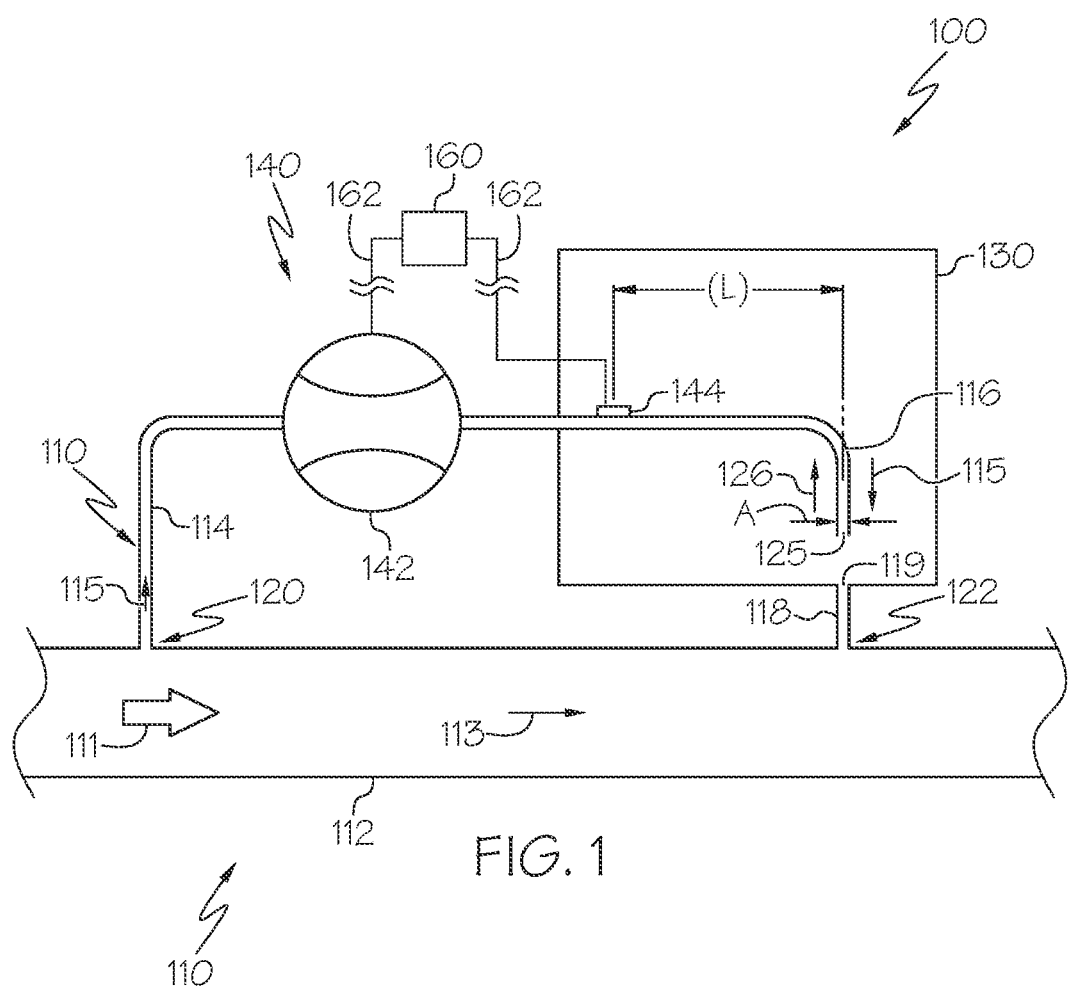
FIG. 1 schematically depicts a flow system comprising a primary flow line and a secondary flow line and a volume fraction meter coupled to the secondary flow line, according to one or more embodiments shown and described herein.

Reference will now be made to a volume fraction meter comprising a flow meter and a strain gauge coupled to a flow line, as well as a method of measuring the volume percentage of the gas and liquid phases of a multiphase fluid flowing through the flow line. Multiphase fluid flow occurs throughout oil and gas production and recovery, where a mixture of oil, brine, and gas is typically found. However, it is difficult to measure the relative volume percentages of the phase components of a multiphase fluid (i.e., a gas portion and a liquid portion), due to the inherent differences between liquid and gas and the variety of flow regimes that may occur in multiphase fluid flow. The volume fraction meter and corresponding method described herein overcome these difficulties in measuring the relative volume percentages in multiphase fluid and provide systems and measurement techniques that are effective in any flow regime. By measuring the relative amounts of each phase (i.e. a gas portion and a liquid portion) in a multiphase fluid flow, appropriate changes to change production parameters may be implemented to optimize oil and gas production and recovery.

When operating the volume fraction meter described herein, multiphase fluid flows through the flow meter, which measures total volumetric flow rate of the multiphase fluid passing through the volume fraction meter. The strain gauge is coupled to the flow line between the volume fraction meter and a turned portion of the flow line and the flow line further includes a nozzle opening positioned downstream the turned portion. Thus, when multiphase fluid is discharged though the nozzle opening, the strain gauge may measure the bending strain on the flow line, as the discharge force of the multiphase fluid at the nozzle opening causes the flow line to deflect. The bending strain can then be used to determine the discharge force of the multiphase fluid through a nozzle opening of the flow line downstream the turned portion. Based on the flow rate and the bending strain, the mixture density of the multiphase fluid flow may be determined. Due to the large difference between the density of liquids and gases, the volume fraction of each phase of the multiphase fluid may be determined based on the mixture density. Embodiments of volume fraction meters and methods of measuring the volume fraction of each phase of a multiphase fluid will now be described and, whenever possible, the same reference numerals will be used throughout the drawings to refer to the same or like parts.

Figure 2:
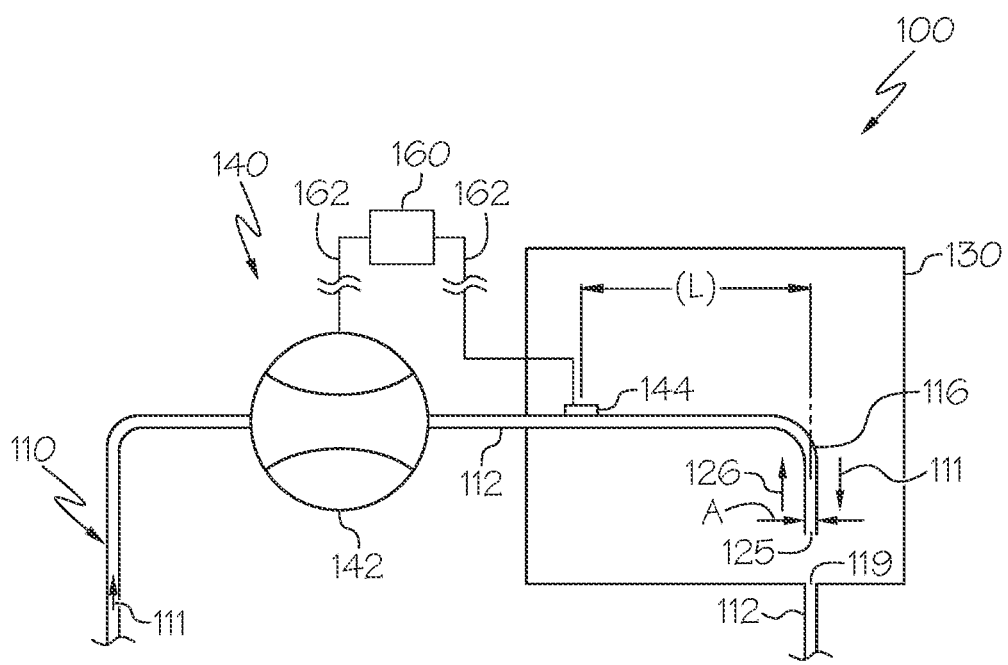
FIG. 2 schematically depicts a flow system comprising a volume fraction meter coupled to a flow line, according to one or more embodiments shown and described herein.

Referring now to FIGS. 1 and 2, a flow system 100 is schematically depicted. The flow system 100 comprises a volume fraction meter 140 coupled to a flow line 110. The flow line 110 includes a nozzle opening 125 and a turned portion 116 located upstream the nozzle opening 125. The flow line 110 is a fluid pathway for multiphase fluid, which flows through the flow line 110 in a flow direction 111. In some embodiments, the flow line 110 and the flow system 100 may be part of an oil and gas production system. The flow line 110 may comprise cylindrical piping of any material suitable for oil and gas production, such as metals or plastics. As used herein, a "multiphase fluid" refers to a fluid or fluid mixture having both a gas portion and a liquid portion. One example multiphase fluid is a wet gas, where 90% or more of the multiphase fluid is in the gas phase. Such wet gases are common in the production of natural gas. The volume fraction meter 140 may positioned in the flow system 100 such that the volume fraction meter 140 operates under atmospheric or near atmospheric conditions to minimize measurement errors caused by pressure. For example, the volume fraction meter 140 may be mounted along the flow line 110 at the end of a process.

The volume fraction meter 140 comprises a flow meter 142 and a strain gauge 144 each coupled to the flow line 110, upstream the nozzle opening 125 and the turned portion 116. The flow meter 142 is configured to measure a volumetric flow rate of the multiphase fluid flowing in the flow direction 111 through the flow line 110. The strain gauge 144 is configured to measure a bending strain on the flow line 110 caused by discharge of the multiphase fluid through the nozzle opening 125, which applies a discharge force in a discharge force direction 126, deflecting the flow line 110. The discharge force direction 126 is a direction opposite the flow direction 111 at the nozzle opening 125. Upon discharge of the multiphase fluid through the nozzle opening 125, the flow line 110 deflects in the discharge force direction 126.

In operation, the multiphase fluid flows through the flow line 110 in a turbulent flow regime. Without intending to be limited by theory, the volume fraction of each phase (i.e., the gas portion and the liquid portion) of the multiphase fluid may be calculated based on the mixture density of the multiphase fluid. In addition, the mixture density may be calculated using the volumetric flow rate measured by the flow meter 142 and the bending strain measured by the strain gauge 144. As shown in FIGS. 1 and 2, the flow system 100 further comprises a computing device 160 that is communicatively coupled to the strain gauge 144 and the flow meter 142 by a communication path 162. In operation, the computing device 160 may calculate the volume fraction of each phase of the multiphase fluid based on inputs received from the strain gauge 144 and the flow meter 142 (i.e., based on the volumetric flow rate and the bending strain).

The computing device 160 may comprise a processor and a non-transitory electronic memory that stores a set of machine-readable instructions, while the processor of the computing device executes the machine-readable instructions stored in the non-transitory electronic memory. For example, the non-transitory electronic memory may comprise RAM, ROM, flash memories, hard drives, or any device capable of storing machine-readable instructions such that the machine-readable instructions can be accessed by the processor. The processor may be any device capable of executing machine-readable instructions, such as an integrated circuit, a microchip, or the like. As used herein, the term "communicatively coupled" means that coupled components are capable of exchanging data signals with one another such as, for example, electrical signals via conductive medium, electromagnetic signals via air, optical signals via optical waveguides, and the like. Accordingly, the communication path 162 may be formed from any medium that is capable of transmitting a signal such as, for example, conductive wires, conductive traces, optical waveguides, or the like. In some embodiments, the communication path 162 may facilitate the transmission of wireless signals, such as WiFi, Bluetooth, and the like. Moreover, the communication path 162 may be formed from a combination of mediums capable of transmitting signals.

While FIGS. 1 and 2 each depict example embodiments of the flow system 100 that include the volume fraction meter 140 coupled to the flow line 110 and communicatively coupled to the computing device 160, in FIG. 1 the volume fraction meter 140 is coupled to a secondary flow line 114 and in FIG. 2 the volume fraction meter 140 is coupled to a primary flow line 112. Indeed, in the embodiment depicted in FIG. 1, the flow line 110 comprises a primary flow line 112 fluidly coupled to a secondary flow line 114. In FIG. 1, the flow direction 111 includes a primary flow direction 113 along the primary flow line 112 and a secondary flow direction 115 along the secondary flow line 114. In the embodiments of FIG. 2, the flow line 110 comprises the primary flow line 112 without the secondary flow line 114 and thus the flow direction 111 is along the primary flow line 112. In FIG. 1 the nozzle opening 125 is located in the secondary flow line 114 and in FIG. 2 the nozzle opening 125 is located in the primary flow line 112. Furthermore, in FIG. 1, the turned portion 116 is disposed in the secondary flow line 114 and in FIG. 2, the turned portion 116 is disposed in the primary flow line 112.

In FIG. 1, the secondary flow line 114 is fluidly coupled to the primary flow line 112 at a fluid inlet 120. In some embodiments, a cross-sectional area of the primary flow line 112 is greater than a cross sectional area of the secondary flow line 114. Moreover, the secondary flow line 114 comprises a uniform cross sectional area A between the flow meter 142 and the nozzle opening 145. In FIG. 1, a continuous volume of the multiphase fluid may enter the secondary flow line 114 from the primary flow line 112 at the fluid inlet 120, allowing for a continuous, controlled volume of the multiphase fluid to traverse through the volume fraction meter 140 before the controlled volume of the multiphase fluid is discharged from the nozzle opening 125. Thus, measurements of volumetric flow rate and bending strain may be performed by the flow meter 142 and the strain gauge 144, respectively, in real time without removing a control volume of the multiphase fluid from the flow line 110. The secondary flow line 114 further includes a return segment 118 that is fluidly coupled to the primary flow line 112 at a fluid outlet 122. The return segment 118 comprises a return opening 119 positioned in alignment with the nozzle opening 125 such that multiphase fluid discharged at the nozzle opening 125 enters the return opening 119 and flows back into the primary flow line 112 through the return segment 118. As shown in FIG. 1, a collection chamber 130 may be coupled to the return segment 118 to provide a fluid chamber to capture multiphase fluid discharged at the nozzle opening 125 and facilitate flow of the multiphase fluid into the return opening 119.

In FIG. 2, the flow meter 142 and the strain gauge 144 are each coupled to the primary flow line 112 and the secondary flow line 114 is not included. Moreover, the primary flow line 112 comprises a uniform cross sectional area A between the flow meter 142 and the nozzle opening 145. The embodiment of FIG. 2 facilitates a bulk measurement of the volume fraction of each phase of a multiphase fluid, allowing the entire flow of the multiphase fluid to flow through the volume fraction meter 140 instead of branching a portion of the multiphase fluid from the primary flow line 112 into the secondary flow line 114. This allows the volumetric flow rate of the entire flow of the multiphase fluid to be measured by the flow meter 142, preventing streamlines of gas or liquid from slipping past the flow meter 142 in laminar flow, which could cause measurement errors. In FIG. 2, the primary flow line 112 comprises the return opening 119 positioned in alignment with the nozzle opening 125 such that multiphase fluid discharged at the nozzle opening 125 enters the return opening 119 and continues to flow through the primary flow line 112. In the embodiments of FIG. 2, the collection chamber 130 may be coupled to the primary flow line 112 at the return opening 119 to provide a fluid chamber to capture multiphase fluid discharged at the nozzle opening 125 and facilitate flow of the multiphase fluid back into the primary flow line 112.

Referring again to FIGS. 1 and 2, the flow meter 142 is coupled to flow line 110 and is positioned upstream the turned portion 116 with respect to the flow direction 111. For example, the flow meter 142 may be fluidly coupled to the flow line 110 such that the multiphase fluid flows through the flow meter 142. In some embodiments, the flow meter 142 comprises a positive displacement flow meter, which enables direct measurement of the volume of any fluid or fluid combination passing through the flow meter. Example positive displacement flow meters that may be used include screw flow meters, reciprocating or oscillating piston flow meters, gear flow meters, nutating disk flow meters, rotary vane flow meters, and diaphragm style positive displacement flow meters. The flow meter 142 may comprise any style of flow meter 142 that is operable in the presence of a multiphase fluid such that the flow meter 142 still operates properly when large gas bubbles are present.

The strain gauge 144 is coupled to the flow line 110 between the flow meter 142 and the turned portion 116 of the flow line 110. The strain gauge 144 is positioned a distance L from the turned portion 116. The strain gauge 144 is configured to measure a bending strain on the flow line 110 at the turned portion 116. In particular, the turned portion 116 facilitates deflection of the flow line 110 in the discharge force direction 126 upon discharge of the multiphase fluid through the nozzle opening 125, which allows the strain gauge 144 to measure the bending strain on the flow line 110. The discharge force direction 126 is opposite the flow direction 111 (e.g., the secondary flow direction 115 in FIG. 1) at the nozzle opening 125. The bending strain and volumetric flow rate provide inputs for determining a discharge force of the multiphase fluid through the nozzle opening 125 and the discharge force provides an input for determining the mixture density of the multiphase fluid, which may be used to determine the volume fraction of liquid in the multiphase fluid. The strain gauge 144 comprises any known or yet to be developed strain gauge sized to be sensitive to the practical range of bending strain on the flow line 110. For example, the strain gauge 144 may be configured to measure microstrain (a unitless value) in a range of from 10 to $1000 \times 10^{-6}$.

The strain gauge 144 is coupled to the flow line 110 fluidly separate from the flow line 110 to protect the strain gauge 144 and its circuitry from the wet environment in the flow line 110. Furthermore, the strain gauge 144 may be coupled to the flow line 110 in alignment with the flow direction 111. This alignment facilitates the measurement of the bending strain on the flow line 110, such that the discharge force can be calculated based on the bending strain of the flow line 110 and the geometry of the flow line 110. In the embodiments depicted in FIGS. 1 and 2, the flow line 110 is cantilevered at the turned portion 116, which turns the flow line 110 by 90°. However other arrangements of the flow line 110 that include a turned portion 116 between the strain gauge 144 between the nozzle opening 125 are contemplated, for example, embodiments in which the turned portion 116 turns the flow line 110 less than 90° or greater than 90°. In some embodiments, the strain gauge 144 is a resistive strain gauge, which may comprise a Wheatstone bridge wiring arrangement having four strain gauge elements electrically connected to form a Wheatstone bridge circuit and positioned to facilitate the measurement of the bending strain on the flow line 110. However, it should be understood that other wiring arrangements may also be utilized. Moreover, it should be understood that the strain gauge 144 may comprise any known or yet to be developed strain gauge.

Referring again to FIGS. 1 and 2, the volume fraction meter 140 may be used to determine a volume fraction of both a gas portion and a liquid portion (i.e., each phase) of the multiphase fluid. Determining the volume fractions of the multiphase fluid includes measuring the volumetric flow rate of the multiphase fluid flowing through the flow line 110 in the flow direction 111 using the flow meter 142 and measuring the bending strain of the flow line 110 at the turned portion 116 using the strain gauge 144. Next, a discharge force of the multiphase fluid flowing through a nozzle opening 125 is determined based on the bending strain measured by the strain gauge 144. In particular, discharge of the multiphase fluid through the nozzle opening 125 applies the discharge force on the flow line 110 in the discharge force direction 126, deflecting the flow line 110 in the discharge force direction 126, which causes the bending strain on the flow line 110. In some embodiments, the discharge force is determined by the computing device 160. Next, a mixture density of the multiphase fluid may be determined based on the volumetric flow rate and the discharge force, for example, by the computing device 160.

Once the mixture density is determined, the volume fraction of both the gas portion and the liquid portion of the multiphase fluid may be determined. Without intending to be limited by theory, the density of any gas is much lower that the density of any liquid. Thus, the particular gas present in the multiphase fluid has a minimal effect on the mixture density of the multiphase fluid because the difference in possible gas densities between all gases is low compared to the difference in densities between a liquid and a gas. This allows the volume fraction of the gas portion and the liquid portion of the multiphase fluid to be determined even without knowledge of the specific fluid present in the multiphase fluid.

Referring still to FIGS. 1 and 2, the volume fraction meter 140 described herein could be used to measure the volume fraction of the gas portion and the liquid portion of the multiphase fluid for multiple points in a cross section. For example, the fluid inlet 120 may be positioned within the primary flow line 112 facing the flow direction 111. While not intending to be limited by theory, if the flow is not in the dispersed regime, the volume fraction meter 140 would pick up fluid fractions specific to that entrance region (e.g., the location of the fluid inlet 120). Moving this entrance region to another location would give yet another fluid fraction. Moving this entrance region to increasingly many positions would capture fluid fractions converging to the average of the flow. A similar effect may be achieved by using multiple volume fraction meters 140 along the flow line 110. Alternatively, as shown in FIG. 1, turning the whole flow vertical to force it into a dispersed regime would yield similar results with only one entrance region (e.g., one fluid inlet 120). While still not intending to be limited by theory, any errors caused by slug flow average out over an extended measurement period.

Figure 3:
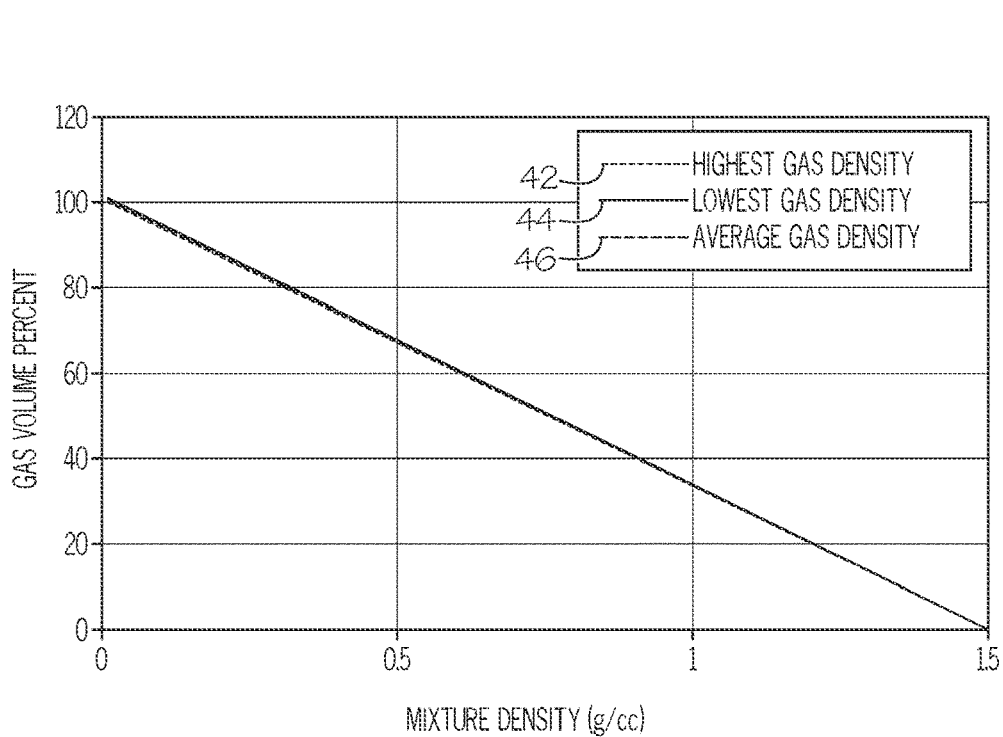
FIG. 3 graphically depicts fluid mixture density as a function of gas volume percent for multiphase fluids, according to one or more embodiments shown and described herein.

Referring now to FIG. 3, graph 40 depicts mixture density as a function of gas volume percent for multiphase fluids having a gas portion with three different gas densities. In particular, line 42 is a multiphase fluid with a gas portion having a highest gas density (e.g., about 1.5 g/cc), line 44 is a multiphase fluid with a gas portion having a low gas density (e.g., about 0.1 g/cc), and line 46 is a multiphase fluid with a gas portion having an average gas density (e.g., about 0.75 g/cc). In graph 40, the differences between lines 42, line 44, and line 46 is minimal, showing that the mixture density of a particular multiphase fluid is minimally effected by an increase or a decrease in the gas density.

Figure 4:
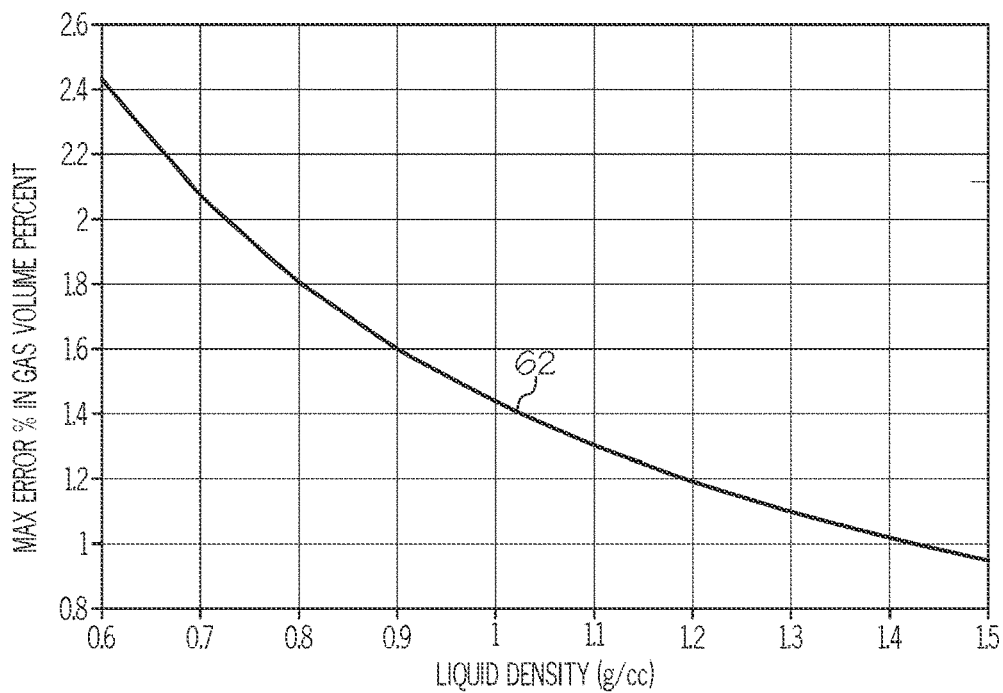
FIG. 4 graphically depicts gas volume percent measurement error as a function of liquid density for a multiphase fluid, according to one or more embodiments shown and described herein.

Referring now to FIG. 4, a graph 60 shows gas volume percent measurement error as a function of liquid density for a multiphase fluid. In particular, line 62 shows that measurement error increases when the density of the liquid portion of the multiphase fluid is reduced. However, line 62 also shows that this error remains low, even for low density liquids, highlighting the viability of the methods described herein.

Referring now to FIGS. 1-4, the calculation of volume fraction of each phase of a multiphase fluid based on measurements performed by the volume fraction meter 140 will now be explored in more detail. Without intending to be limited by theory, from Newton's second law for systems, a control volume, such as a volume of the multiphase fluid, moving relative to an inertial coordinate frame has a force ($\vec{F}$) is given by the following equation (1), where $\vec{P}$ is the momentum of the system and t is time.

$$\vec{F} = \frac{d\vec{P}}{dt}\bigg)_{System} \tag{1}$$

The momentum $\vec{P}$ of the system is given by equation (2) where $\vec{V}$ is the velocity of the multiphase fluid flowing in the system, p is the mixture density of the multiphase fluid, and $\forall$ is the volume of the multiphase fluid. Without intending to be limited by theory, equation (1) is true for any volume of multiphase. In the present case, the volume $\forall$ is any closed volume between the nozzle opening 125 and any location upstream the nozzle opening 125. Indeed, while still not intending to be limited by theory, the force on the strain gauge 144 remains unchanged even if the volume upstream the nozzle opening 125 is infinitely long, as long as the exit velocity of the multiphase fluid and the fluid density remain the same throughout the measurement.

$$\vec{P} = \int_{\forall(System)} \vec{V} \rho d\forall \tag{2}$$

Considering that the total change in the momentum $\vec{P}$ of the system includes all surface effects $\vec{P}_S$ and body effects $\vec{P}_B$, the momentum $\vec{P}$ of the system can be expressed by equation (3) and equation (4), where S is a control surface, A is a cross sectional area of the flow line 110 in the nozzle region 125 and CV is the control volume of the multiphase fluid.

$$\frac{d\vec{P}}{dt} = \frac{d\vec{P}_S}{dt} + \frac{d\vec{P}_B}{dt} \tag{3}$$

$$\frac{d\vec{P}}{dt}\bigg)_{System} = \int_S \vec{V}^2 \rho dA + \frac{\delta}{\delta t}\int_{CV} \vec{V} \rho d\forall \tag{4}$$

Because measurements by the volume fraction meter 140 are taken at a constant flow rate, the time dependent parts of equations (3) and (4) may be removed, allowing equation (4) to be simplified into equation (5), below.

$$\vec{F} = \int_S \vec{V}^2 \rho \, dA \quad (5)$$

As described above, the flow line 100 has a uniform cross sectional area A between the flow meter 142 and the nozzle opening 125, thus removing the need for integration, allowing equation (5) to be simplified into equation (6), below.

$$\vec{F} = \vec{V}^2 \rho A \quad (6)$$

Rearranging equation (6) to solve for the mixture density ρ gives equation (7), below.

$$\rho = \frac{\vec{F}}{\vec{V}^2 A} \quad (7)$$

In addition, velocity $\vec{V}$ is calculated periodically by the flow meter 142 using the following equation (8) to find fluid velocity in a flow, where t is a time value for a given period of measurement.

$$V = \frac{\forall}{At} \quad (8)$$

The mixture density ρ calculated from equation (7) is the density the multiphase fluid flowing through the nozzle region 125 and can be broken into its partial densities using equation (9), below, where $\rho_g$ and $$\frac{\forall_g}{\forall}$$

are the density and volume fraction, respectively, of the gas portion of the multiphase fluid, and $\rho_a$ and $$\frac{\forall_a}{\forall}$$

are the density and volume traction, respectively, of the liquid portion of the multiphase fluid.

$$\rho = \frac{\rho_g \forall_g + \rho_1 \forall_1 + \cdots + r_{:n} \forall_n}{\forall_g + \forall_1 + \cdots + \forall_n} = \frac{\rho_g \forall_g}{\forall} + \frac{\rho_a \forall_a}{\forall} \quad (9)$$

Since the volume fractions must sum to the total volume, $\forall_a/\forall$ can be written as shown in equation (10), below.

$$\frac{\forall_g}{\forall} = 1 - \frac{\forall_g}{\forall} \quad (10)$$

Thus, equation (9) can be re-written as shown in equation (11), below.

$$\rho = \frac{\rho_g \forall_g}{\forall} + \rho_a \left(1 - \frac{\forall_g}{\forall}\right) \quad (11)$$

Moreover, solving equation (11) for the gas volume fraction $$\frac{\forall_g}{\forall}$$

yields equation (12), below.

(3)

$$\frac{\forall_g}{\forall} = \frac{\rho - \rho_a}{\rho_g - \rho_a} \quad (12)$$

The volume fraction of the liquid portion of the multiphase fluid may be calculated using equation (13), below.

$$\frac{\forall_g}{\forall} = \frac{\rho - \rho_g}{\rho_a - \rho_g} \quad (13)$$

Thus, the accuracy of the volume fraction calculation is dependent on the measurement accuracy of both the flow meter 142 and the strain gage 144, which is used to determine the mixture density of the multiphase fluid. However, without intending to be limited by theory, pressure may cause some errors in the measurement as compressed gas exhibits a higher density than gas at ambient pressures. From the ideal gas law, shown in equation (14), below, density increases proportionally to pressure P.

$$\rho = P/(RT) \quad (14)$$

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising.

What is claimed is:

1. A volume fraction meter comprising a flow meter, a flow line, and a strain gauge, wherein:
   the flow meter is coupled to and positioned upstream from a turned portion of the flow line, with respect to a flow direction, and is configured to measure a volumetric flow rate of a multiphase fluid flowing in the flow direction through the flow line;
   the flow line comprises a nozzle opening downstream of the turned portion of the flow line; and
   the strain gauge is coupled to the flow line between the flow meter and the turned portion of the flow line, and is configured to measure a bending strain on the flow line upon discharge of the multiphase fluid through the nozzle opening, such that the bending strain and the volumetric flow rate provide inputs for determining a mixture density of the multiphase fluid.

2. The volume fraction meter of claim 1, wherein the flow line comprises a uniform cross sectional area between the flow meter and the nozzle opening.

3. The volume fraction meter of claim 1, wherein the bending strain and the volumetric flow rate provide inputs for determining a discharge force of the multiphase fluid through the nozzle opening and the discharge force provides an input for determining the mixture density of the multiphase fluid.

4. The volume fraction meter of claim 1, wherein the flow meter and the strain gauge are communicatively coupled to a computing device configured to determine the mixture density of the multiphase fluid and, based on the mixture density, determine a volume fraction of a liquid portion and a gas portion in the multiphase fluid.

5. The volume fraction meter of claim 1, wherein the strain gauge is coupled to the flow line in alignment with the flow direction.

6. The volume fraction meter of claim 1, wherein the strain gauge comprises a Wheatstone bridge wiring arrangement.

7. The volume fraction meter of claim 1, wherein the strain gauge is coupled to the flow line fluidly separate from the flow line.

8. The volume fraction meter of claim 1, wherein the flow meter comprises a positive displacement flow meter.

9. The volume fraction meter of claim 1, wherein:
   the flow line comprises a uniform cross sectional area between the flow meter and the nozzle opening; and
   the flow meter and the strain gauge are communicatively coupled to a computing device configured to determine a discharge force of the multiphase fluid through the nozzle opening based on the bending strain and the volumetric flow rate, determine the mixture density based on the volumetric flow rate and the discharge force, and determine a volume fraction of a liquid portion and a gas portion in the multiphase fluid based on the mixture density.

10. A flow system comprising a volume fraction meter, a primary flow line, and a secondary flow line, and a volume fraction meter comprising a flow meter and a strain gauge, wherein:
    the secondary flow line is fluidly coupled to the primary flow line and comprises a nozzle opening and a turned portion that is upstream of the nozzle opening with respect to a flow direction;
    the flow meter is coupled to the secondary flow line upstream of the turned portion of the secondary flow line, with respect to the flow direction, and is configured to measure a volumetric flow rate of a multiphase fluid flowing in the flow direction through the flow line; and
    the strain gauge is coupled to the secondary flow line between the flow meter and the turned portion of the flow line, and is configured to measure a bending strain on the secondary flow line upon discharge of the multiphase fluid through the nozzle opening, such that the bending strain and the volumetric flow rate provide inputs for determining a mixture density of the multiphase fluid.

11. The flow system of claim 10, wherein the secondary flow line comprises a uniform cross sectional area between the flow meter and the nozzle opening.

12. The volume fraction meter of claim 10, wherein the secondary flow line further comprises a return arm fluidly coupled to the primary flow line at a fluid outlet, wherein the return arm comprises a return opening aligned with the nozzle opening.

13. The volume fraction meter of claim 12, further comprising a collection chamber coupled to the return arm.

14. The volume fraction meter of claim 10, wherein a cross sectional area of the primary flow line is greater than a cross sectional area of the secondary flow line.

15. A method of determining a volume fraction of a liquid portion and a gas portion in a multiphase fluid, the method comprising:
    measuring a volumetric flow rate of a multiphase fluid flowing through a flow line in a flow direction using a flow meter coupled to the flow line, wherein the flow line comprises a turned portion, the flow meter is positioned upstream the turned portion with respect to the flow direction, and the flow line comprises a nozzle opening downstream the turned portion;
    measuring a bending strain on the flow line upon discharge of the multiphase fluid through the nozzle opening using a strain gauge coupled to the flow line between the flow meter and the turned portion;
    determining a mixture density of the multiphase fluid based on the volumetric flow rate and the bending strain; and
    determining a volume fraction of a liquid portion and a gas portion of the multiphase fluid based on the mixture density of the multiphase fluid.

16. The method of claim 15, further comprising determining a discharge force of the multiphase fluid through the nozzle opening based on the volumetric flow rate and the bending strain, wherein the discharge force provides an input for determining the mixture density of the multiphase fluid.

17. The method of claim 16, wherein the discharge force deflects the flow line in a discharge force direction thereby applying the bending strain to the flow line.

18. The method of claim 17, wherein the discharge force direction is opposite the flow direction at the nozzle opening.

19. The method of claim 15, wherein:
   the flow line comprises a primary flow line and a secondary flow line;
   the secondary flow line is fluidly coupled to the primary flow line at a fluid inlet;
   the secondary flow line comprises the nozzle opening and the turned portion;
   the flow meter and the strain gauge are coupled to the secondary flow line upstream the turned portion; and
   the strain gauge measures a bending strain on the secondary flow line upon discharge of the multiphase fluid through the nozzle opening.

20. The method of claim 15, wherein the multiphase fluid comprises a wet gas.

* * * * *